United States Patent
Lin et al.

(10) Patent No.: US 11,927,209 B2
(45) Date of Patent: Mar. 12, 2024

(54) MOUNTING SEAT FOR DOORBELL AND DOORBELL ASSEMBLY

(71) Applicant: ALPHA NETWORKS INC., Hsinchu (TW)

(72) Inventors: Tzu-Chih Lin, Hsinchu (TW); Pei-Li Hu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 170 days.

(21) Appl. No.: 17/743,076

(22) Filed: May 12, 2022

(65) Prior Publication Data
US 2023/0235761 A1 Jul. 27, 2023

(30) Foreign Application Priority Data
Jan. 26, 2022 (TW) .................................. 111103370

(51) Int. Cl.
*G03B 17/56* (2021.01)
*F16B 2/02* (2006.01)

(52) U.S. Cl.
CPC .............. *F16B 2/02* (2013.01); *G03B 17/561* (2013.01)

(58) Field of Classification Search
CPC .................................................. G03B 17/561
See application file for complete search history.

(56) References Cited

U.S. PATENT DOCUMENTS 11,609,485 B2 * 3/2023 Boyes ................ F16M 11/2014

FOREIGN PATENT DOCUMENTS

| CN | 205657757 U | * | 10/2016 |
| CN | 110430371 A | * | 11/2019 |
| CN | 212160851 U | * | 12/2020 |
| CN | 215219843 U | * | 12/2021 |

* cited by examiner

*Primary Examiner* — Leon W Rhodes, Jr.
(74) *Attorney, Agent, or Firm* — Birch, Stewart, Kolasch & Birch, LLP (57) ABSTRACT

A mounting seat is connected to a doorbell includes a mounting portion, an extendable portion, and a connecting portion. The mounting portion is connected to a mounting surface. The extendable portion is connected to the mounting portion. The extendable portion could be extended or retracted by exerting force. The extendable portion includes a first extendable section and a second extendable section. The connecting portion is connected between the extendable portion and the doorbell. When the first extendable section is extended or retracted relative to the mounting portion, the extendable portion drives the connecting portion and the doorbell to turn along a first axis. When the second extendable section is extended or retracted relative to the mounting portion, the extendable portion drives the connecting portion and the doorbell to turn along a second axis. The first axis is not parallel to the second axis.

10 Claims, 13 Drawing Sheets

MOUNTING SEAT FOR DOORBELL AND DOORBELL ASSEMBLY

BACKGROUND OF THE INVENTION

Technical Field

The present invention is related to a mounting seat of a doorbell, and more particularly to a mounting seat and a doorbell assembly that allow an angle of the doorbell to be adjustable.

Description of Related Art

A conventional doorbell generally includes an indoor device and an outdoor device. A visitor can press a button on the outdoor device to generate a warning signal to inform people in the house. Additionally, the visitor could have a dialogue with the people in the house via the indoor device and the outdoor device. After the people in the house identify the visitor, the people in the house could send a signal through the indoor device to a locker of the door to unlock the door.

Nowadays, most of the conventional doorbells include a camera disposed on the outdoor device to capture an image of the visitor. With the image of the visitor, the people in the house can identify the visitor more precisely. However, the camera is generally disposed on a main body of the outdoor device of the doorbell. In other words, when the doorbell is mounted to a mounting surface like a wall via a mounting seat, the angle and field of the camera are fixed. Therefore, the user can not adjust the doorbell (namely the angle of the camera) according to the difference between the mounting surfaces or required demands. Therefore, the installation position of the doorbell is limited, and the angle of the camera can not fulfill the required demand. Therefore, the conventional mounting seat has room for improvement.

BRIEF SUMMARY OF THE INVENTION

In view of the above, the primary objective of the present invention is to provide a mounting seat for a doorbell and a doorbell assembly that allow the angle of the doorbell to be adjustable.

The present invention provides a mounting seat, wherein the mounting seat is mounted on a mounting surface and is connected to a doorbell. The mounting seat includes a mounting portion, an extendable portion, and a connecting portion. The mounting portion is connected to the mounting surface. The extendable portion is connected to the mounting portion, wherein the extendable portion and the mounting surface are located at opposite two sides of the mounting portion, respectively. When the extendable portion is exerted by a force, the extendable portion is operable to extend or to retract relative to the mounting portion. The extendable portion includes a first extendable section and a second extendable section. The connecting portion is connected to the extendable portion and the doorbell and located between the extendable portion and the doorbell. When the first extendable section is exerted by a force to extend or retract relative to the mounting portion, the extendable portion drives the connecting portion and the doorbell to turn along a first axis. When the second extendable section is exerted by a force to extend or retract relative to the mounting portion, the extendable portion drives the connecting portion and the doorbell to turn along a second axis. The first axis and the second axis are not parallel to each other.

The present invention further provides a doorbell assembly, including said mounting seat and a doorbell. The doorbell includes a main body and an image capturing module, wherein the main body has a front side and a rear side that face opposite directions. The image capturing module is disposed at the front side, and the rear side of the main body is connected to the connecting portion of the mounting seat.

With such design, the extendable portion drives the connecting portion and the doorbell to turn along the first axis and/or the second axis. The user could adjust the angle of the doorbell along two different axes, so that the image capturing module on the main body of the doorbell could be adjusted as the angle of the doorbell is adjusted.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
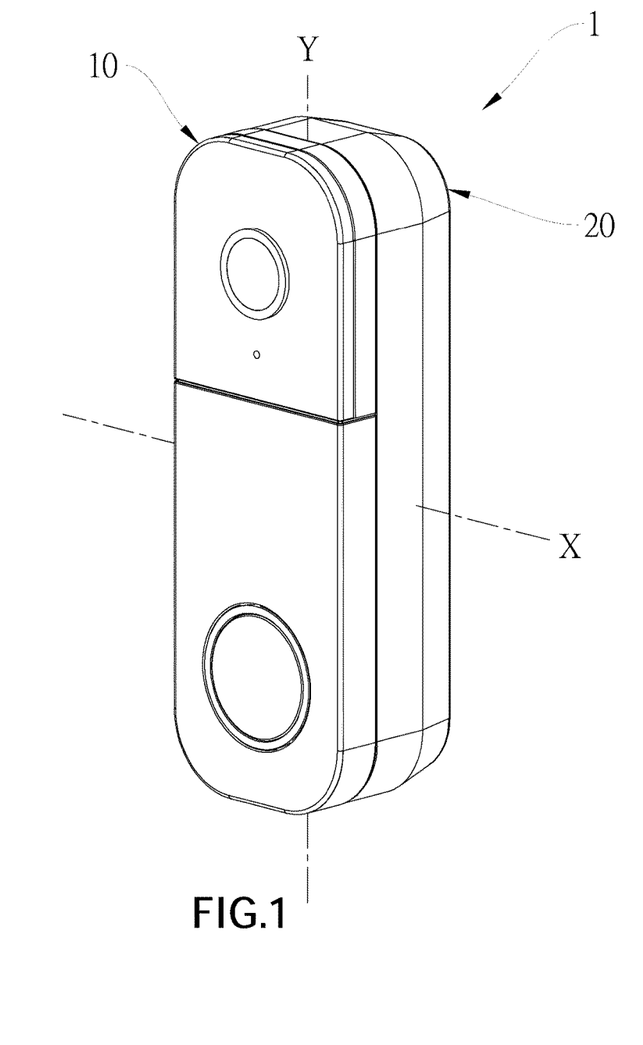
FIG. 1 is a perspective view of the doorbell assembly of an embodiment according to the present invention.
Figure 2:
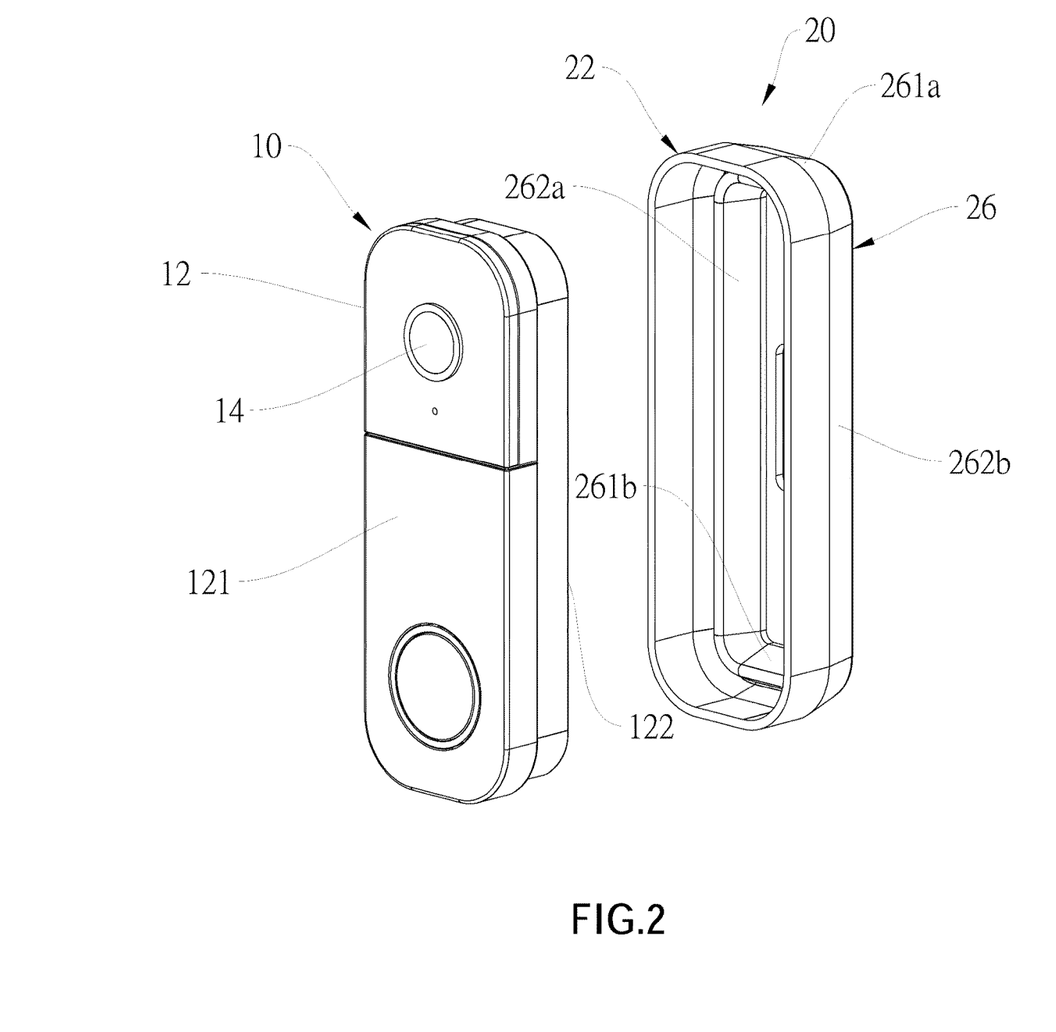
FIG. 2 is an exploded view of the doorbell assembly of the embodiment according to the present invention.
Figure 3:
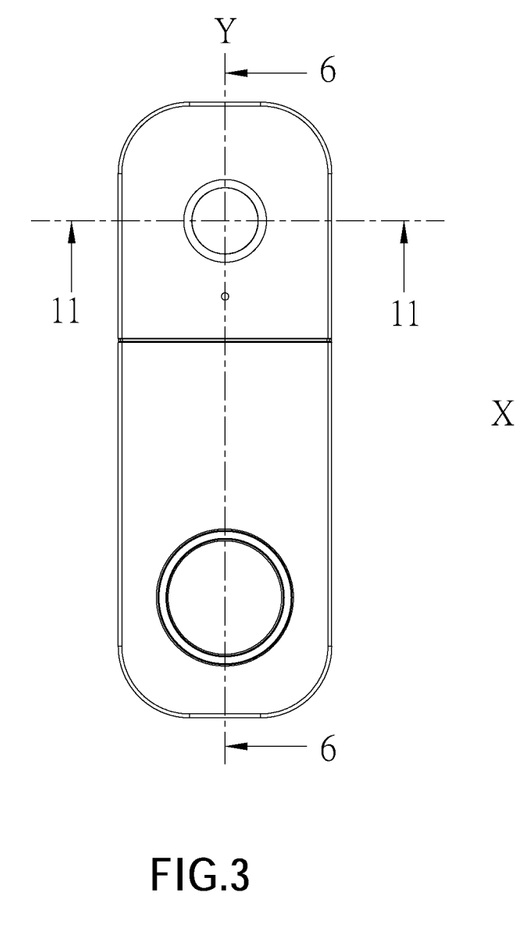
FIG. 3 is a front view of the doorbell assembly shown in FIG. 1.

A doorbell assembly 1 of an embodiment according to the present invention is illustrated in FIG. 1 to FIG. 13. As illustrated in FIG. 1 to FIG. 3, the doorbell assembly 1 includes a doorbell 10 and a mounting seat 20, wherein the doorbell 10 includes a main body 12 and an image capturing module 14. The main body 12 has a front side 121 and a rear side 122 that face opposite directions. The image capturing module 14 is located at the front side 121. The rear side 122 of the main body 12 is connected to a connecting portion 22 of the mounting seat 20. The image capturing module 14 is adapted to capture or shoot an image of a face of a guest outside a door, and then a video signal of the image is transmitted to a display device for person inside the door to watch or identify.

In the current embodiment, the rear side 122 of the main body 12 is connected to the connecting portion 22 by interlocking. In practically, the rear side 122 of the main body 12 could be connected to the connecting portion 22 in any other means. For example, the rear side 122 of the main body 12 could be connected to the connecting portion 22 by hooking, buckling, adhering, or using a fastener like screw. The means of connection between the rear side 122 of the main body 12 and the connecting portion 22 are included but not limited to the means disclosed above.

Figure 4:
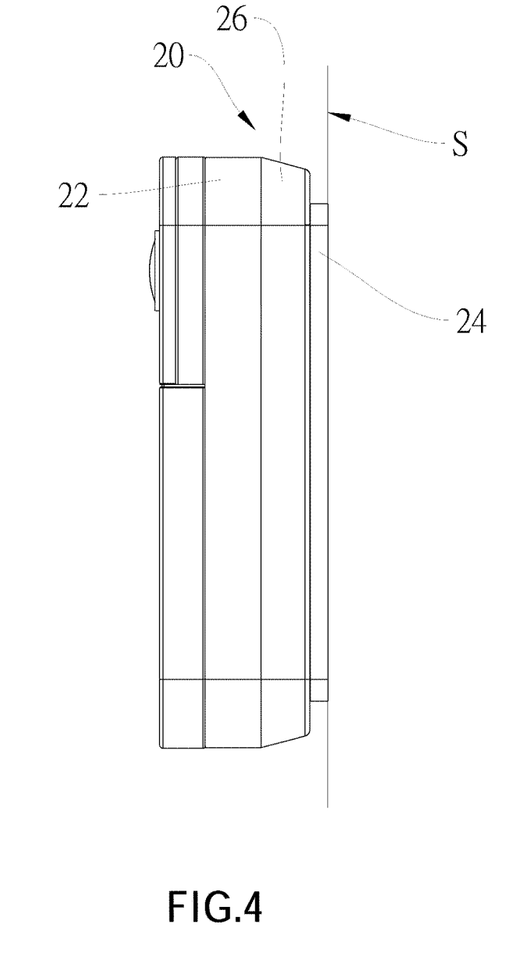
FIG. 4 is a side view of the doorbell assembly shown in FIG. 1.
Figure 5:
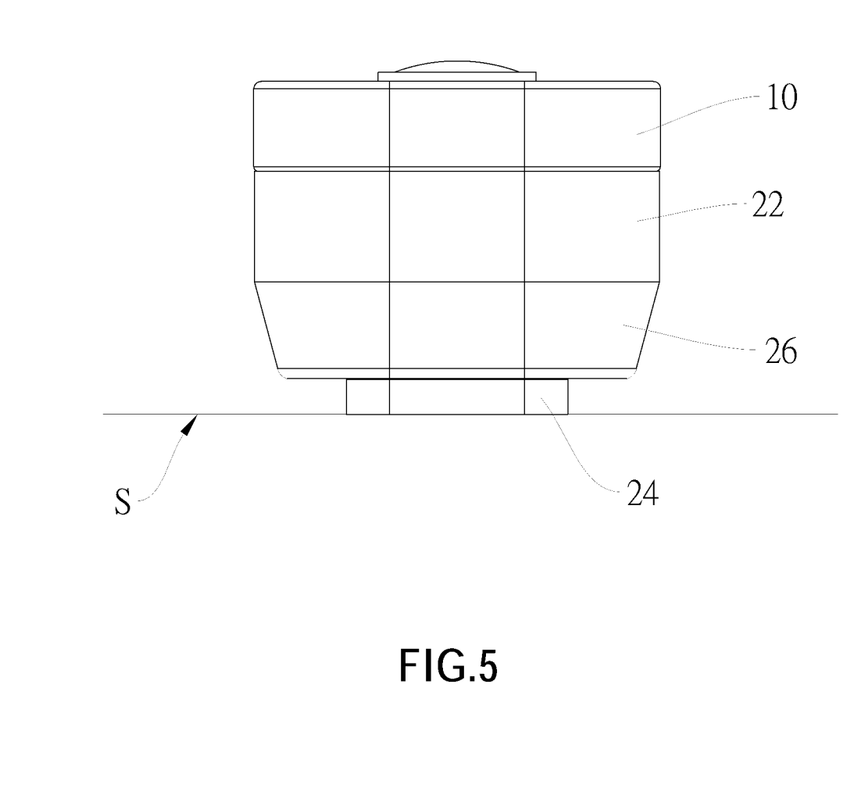
FIG. 5 is a top view of the doorbell assembly shown in FIG. 1.
Figure 6:
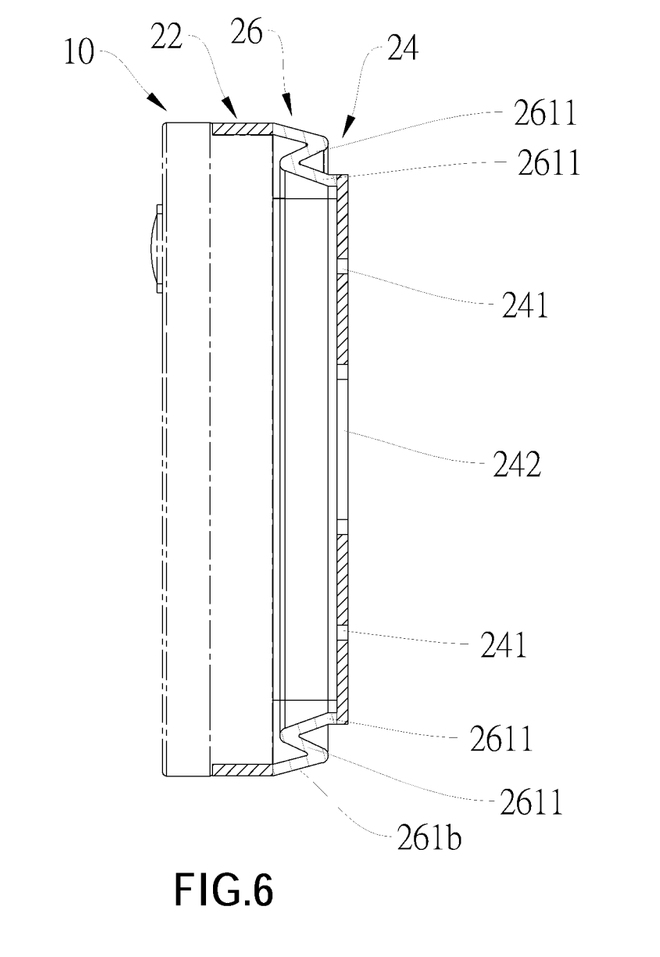
FIG. 6 is a sectional view of the FIG. 3 along the line 6-6.

As illustrated in FIG. 4 and FIG. 5, the mounting seat 20 is provided on a mounting surface S. The mounting seat 20 includes a mounting portion 24, an extendable portion 26, and the connecting portion 22, wherein the mounting portion 24 is connected to the mounting surface S. As illustrated in FIG. 6, in the current embodiment, the mounting portion 24 has a plurality of perforations 241 and a hole 242 for wire to pass through. The perforations 241 are provided for screws to pass through, so that the screws could fix the mounting portion 24 to the mounting surface S like a wall. The hole 242 is provided for a wire or a core passing through the mounting surface S to enter the mounting seat 20, so that the wire or the core could be connected to the doorbell 10 disposed on the mounting seat 20. The extendable portion 26 is connected to the mounting portion 24, and the extendable portion 26 and the mounting surface S are located at opposite two sides of the mounting portion 24, respectively (namely, the mounting portion 24 is located between the extendable portion 26 and the mounting surface S). Besides, the connecting portion 22 is located between the extendable portion 26 and the doorbell 10.

Figure 7:
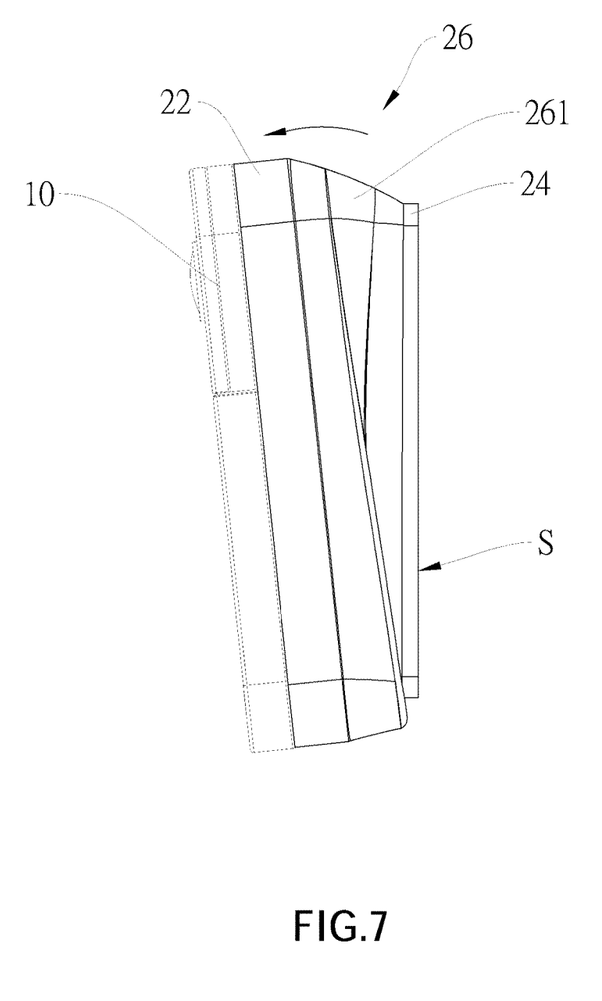
FIG. 7 is similar to FIG. 4, showing the first extendable section of the doorbell assembly is extended.
Figure 8:
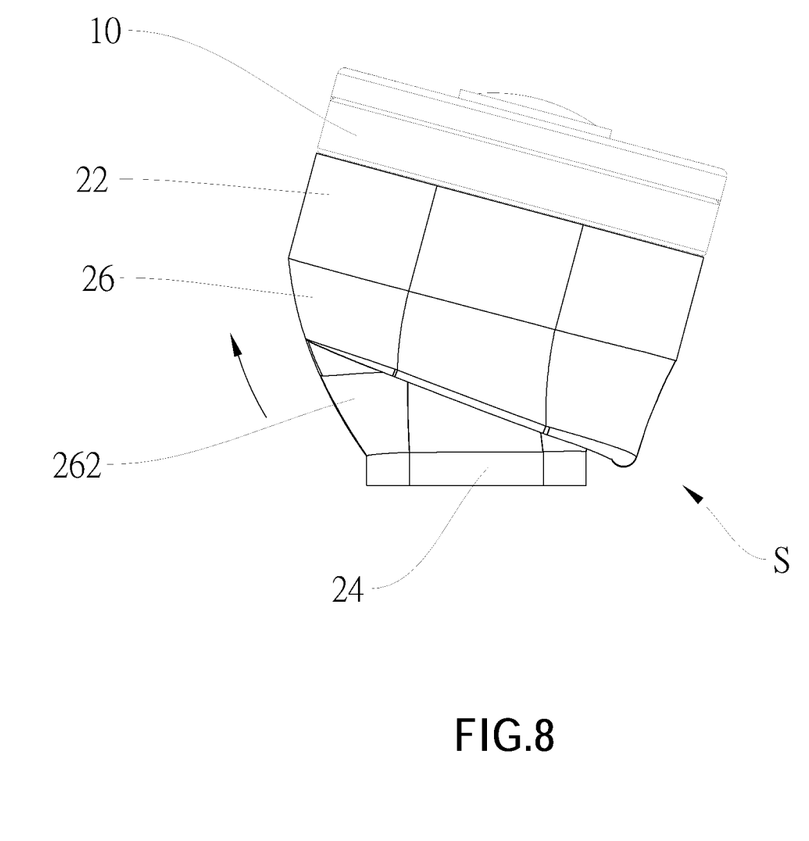
FIG. 8 is similar to FIG. 5, showing the second extendable section of the doorbell assembly is extended.

As illustrated in FIG. 7 and FIG. 8, the extendable portion 26 could be extended or retracted relative to the mounting portion 24 by exerting a force. The extendable portion 26 includes a first extendable section 261 and a second extendable section 262. When the first extendable section 261 is exerted by a force to extend or retract relative to the mounting portion 24, the extendable portion 26 drives the connecting portion 22 and the doorbell 10 to turn along a first axis X. When the second extendable section 262 is exerted by a force to extend or retract relative to the mounting portion 24, the extendable portion 26 drives the connecting portion 22 and the doorbell 10 to turn along a second axis Y. As illustrated in FIG. 1, the first axis X and the second axis Y are not parallel to each other. With such design, a user could adjust a turning angle of the doorbell 10 along two different axes on a required demand, and a camera angle of the image capturing module 14 could be adjusted as the main body 12 of the doorbell 10 is turned, so that the user could adjust the camera angle.

In the current embodiment, the first axis X is perpendicular to the second axis Y. In other embodiments, the first axis X could be not perpendicular to the second axis Y as well.

As illustrated in FIG. 2, the first extendable section 261 includes a top extendable section 261a and a bottom extendable section 261b that face opposite directions, wherein the top extendable section 261a corresponds to a top portion of the doorbell 10, and the bottom extendable section 261b corresponds to a bottom portion of the doorbell 10. The second extendable section 262 includes a right extendable section 262a and a left extendable section 262b that face opposite directions, wherein the left extendable section 262b corresponds to a left side of the doorbell 10, and the right extendable section 262a corresponds to a right side of the doorbell 10. The extendable portion 26 is constituted by the top extendable section 261a, the bottom extendable section 261b, the left extendable section 262b, and the right extendable section 262a. The top extendable section 261a, the left extendable section 262b, the bottom extendable section 261b, and the right extendable section 262a are sequentially connected to one another to form a circle.

Figure 9:
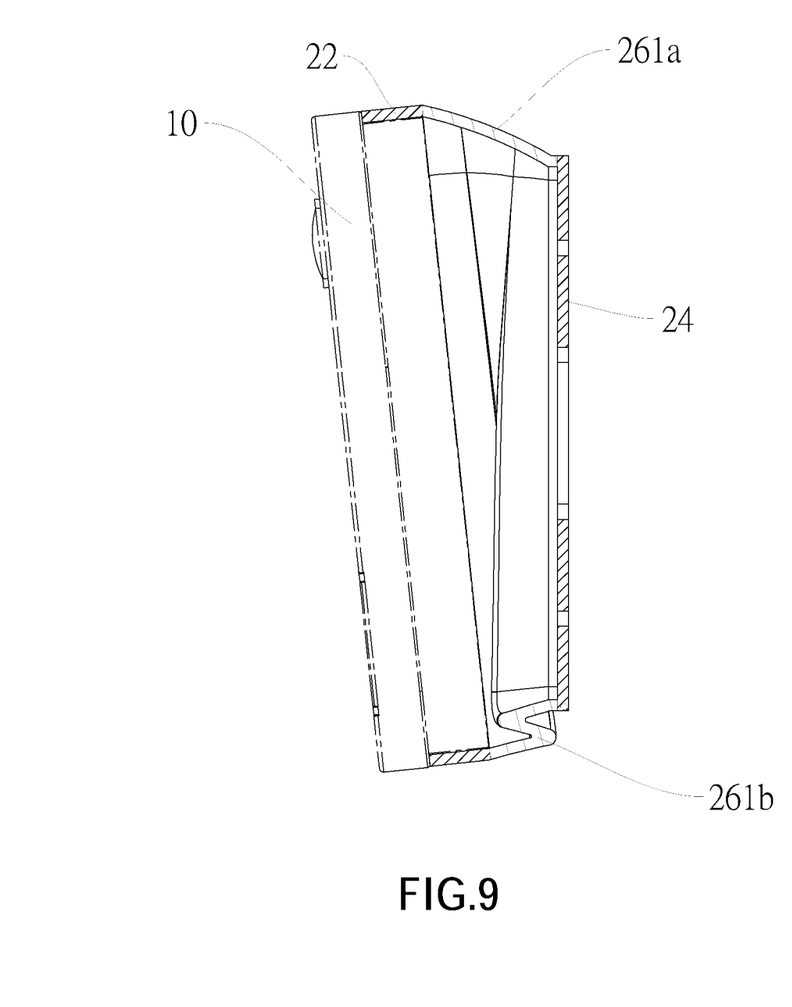
FIG. 9 is similar to FIG. 6, showing the top extendable section of the doorbell assembly is extended.
Figure 10:
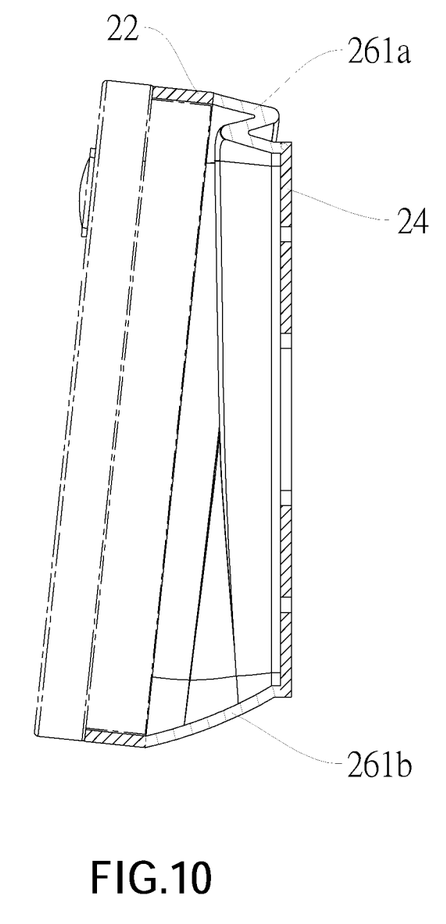
FIG. 10 is similar to FIG. 6, showing the bottom extendable section of the doorbell assembly is extended.

With such design, when the user exerts a force in a direction away from the mounting surface S to the top extendable section 261a, the top extendable section 261a could be extended relative to the mounting portion 24 from a folded state (as shown in FIG. 6) to an extended state (as shown in FIG. 9), so that the connecting portion 22 and the doorbell 10 are driven to turn downward along the first axis X, thereby adjusting the camera angle of the image capturing module 14 to move downward. Similarly, when the user exerts a force in a direction away from the mounting surface S to the bottom extendable section 261b, the bottom extendable section 261b could be extended relative to the mounting portion 24 from a folded state (as shown in FIG. 6) to an extended state (as shown in FIG. 10), so that the connecting portion 22 and the doorbell 10 are driven to turn upward along the first axis X, thereby adjusting the camera angle of the image capturing module 14 to move upward.

Figure 11:
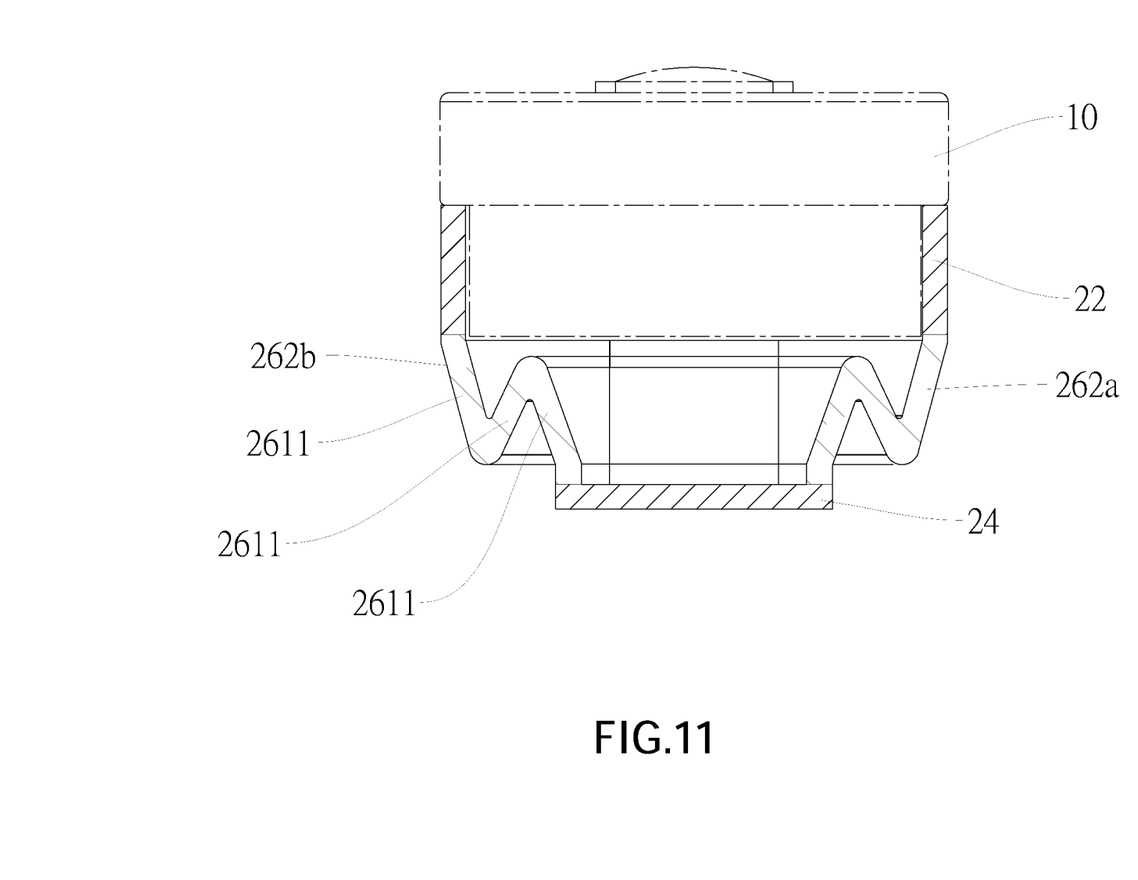
FIG. 11 is a sectional view of the FIG. 3 along the line 11-11.
Figure 12:
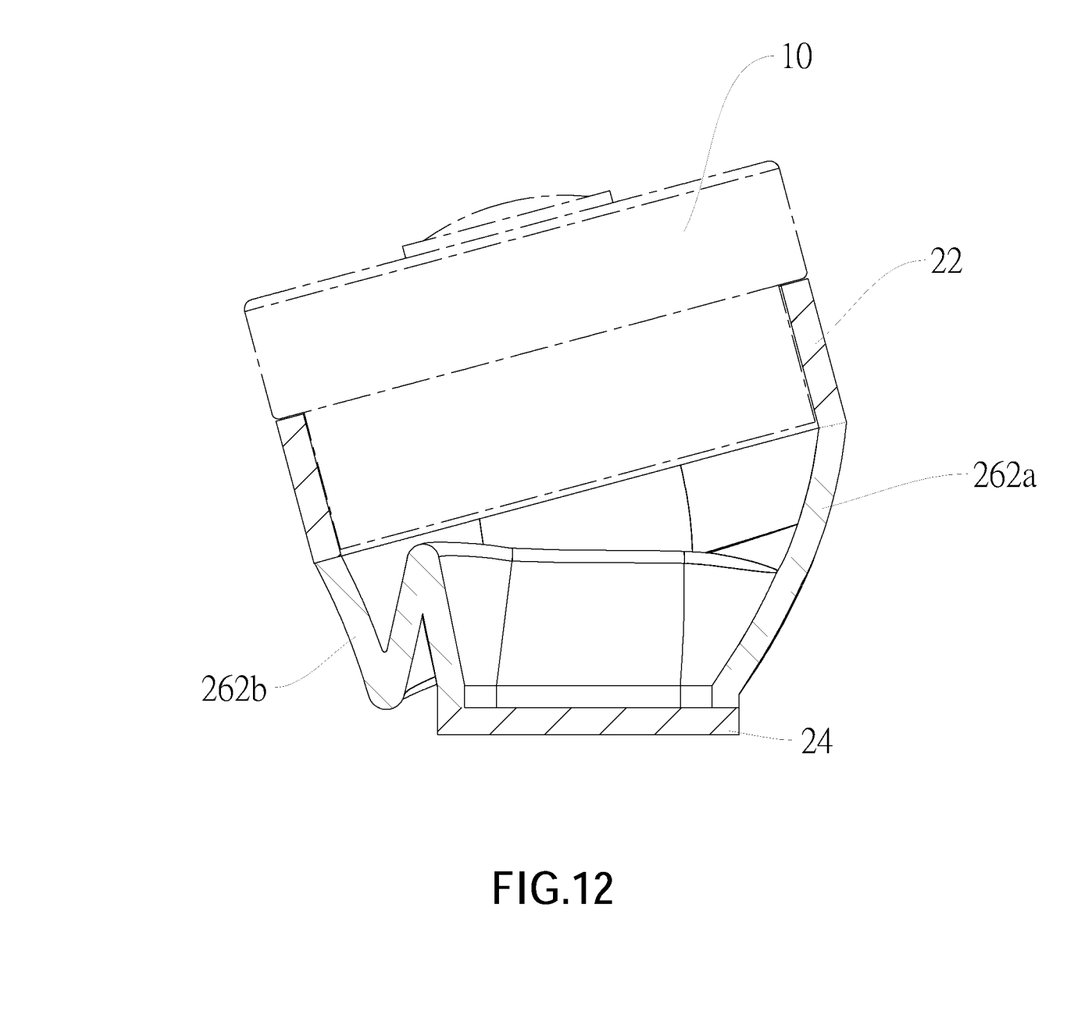
FIG. 12 is similar to FIG. 11, showing the right extendable section of the doorbell assembly is extended.
Figure 13:
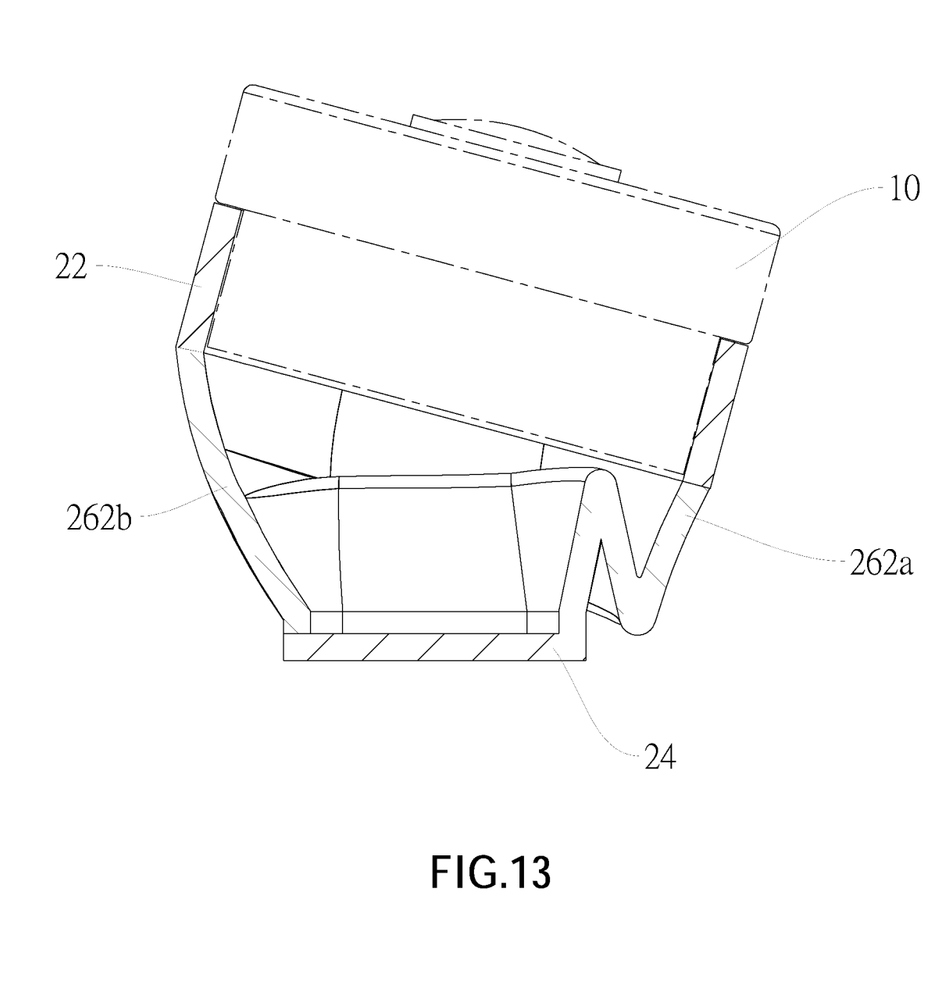
FIG. 13 is similar to FIG. 11, showing the left extendable section of the doorbell assembly is extended.

More specifically, when the user exerts a force in a direction away from the mounting surface S to the right extendable section 262a, the right extendable section 262a could be extended relative to the mounting portion 24 from a folded state (as shown in FIG. 11) to an extended state (as shown in FIG. 12), so that the connecting portion 22 and the doorbell 10 are driven to turn leftward along the second axis Y, thereby adjusting the camera angle of the image capturing module 14 to move leftward. Similarly, when the user exerts a force in a direction away from the mounting surface S to the left extendable section 262b, the left extendable section 262b could be extended relative to the mounting portion 24 from a folded state (as shown in FIG. 11) to an extended state (as shown in FIG. 13), so that the connecting portion 22 and the doorbell 10 are driven to turn rightward along the second axis Y, thereby adjusting the camera angle of the image capturing module 14 to move rightward. By simply adjusting the state of the extendable portion 26 to variously change the turning angle of the doorbell 10, which is an angle between the mounting surface S and the front side 121 of the doorbell 10, a field of the image capturing module 14 could be arbitrarily and properly adjusted.

On the contrary, when each of the top extendable section 261a, the bottom extendable section 261b, the left extendable section 262b, and the right extendable section 262a is positioned in the extended state, the user could exert a force in a direction toward the mounting surface S to return that extended one of the top extendable section 261a, the bottom extendable section 261b, the left extendable section 262b, and the right extendable section 262a back to the folded state. In other embodiments, the first extendable section 261 could merely include one of the top extendable section 261a and the bottom extendable section 261b, and the second extendable section 262 could merely include one of the left extendable section 262b and the right extendable section 262a.

The extendable portion 26 is made of an elastic and flexible material. For example, the extendable portion 26 could be made of hard silicone rubber, so that the extendable portion 26 could stably retain in the extended state. The connecting portion 22 and the mounting portion 24 could be made of plastic material. In the current embodiment, the extendable portion 26, the connecting portion 22, and the mounting portion 24 could be integrally formed as a monolithic unit by co-injection molding, thereby reducing a number of components and simplifying a manufacturing process. In the current embodiment, a connection site between the top extendable section 261a and the right extendable section 262a and a connection site between the top extendable section 261a and the left extendable section 262b are curved. A connection site between the bottom extendable section 261b and the left extendable section 262b and a connection site between the bottom extendable section 261b and the right extendable section 262a are curved. Thus, a deterioration of the extendable portion 26 could be avoided after repeated operations.

As illustrated in FIG. 6 and FIG. 11, each of the first extendable section 261 and the second extendable section 262 includes a plurality of folded parts 2611, wherein each of the folded parts 2611 are connected to one another. When either the first extendable section 261 or the second extendable section 262 is retracted relative to the mounting portion 24, the folded parts 2611 of the retracted one of the first extendable section 261 and the second extendable section 262 are folded. When either the first extendable section 261 or the second extendable section 262 is extended relative to the mounting portion 24, the folded parts 2611 of the extended one of the first extendable section 261 and the second extendable section 262 are stretched. As illustrated in FIG. 9 and FIG. 11, a width of the extendable portion 26 is gradually reduced in a direction from the connecting portion 22 to the mounting portion 24. With such design, when the folded parts 2611 of either first extendable section 261 or the second extendable section 262 are folded, the folded part 2611 that is away from the connecting portion 22 could be stored at an inner side the folded part 2611 that is adjacent to the connecting portion 22.

In the current embodiment, the folded parts 2611 of either the first extendable section 261 or the second extendable section 262 are completely extended or folded as an example. In practice, either the first extendable section 261 or the second extendable section 262 could be disposed with more folded parts 2611 that are connected to one another. With such design, the folded parts 2611 of the first extendable section 261 could be partially stretched, so that the first extendable section 261 could drive the connecting portion 22 to move the doorbell 10 to be located at a first medium angle. Similarly, the folded parts 2611 of the second extendable section 262 could be partially stretched, so that the second extendable section 262 could drive the connecting portion 22 to move the doorbell 10 to be located at a second medium angle. When the folded parts 2611 of the first extendable section 261 are completely stretched, the first extendable section 261 drives the connecting portion 22 and the doorbell 10 to be located at a first angle. When the folded parts 2611 of the second extendable section 262 are completely stretched, the second extendable section 262 drives the connecting portion 22 and the doorbell 10 to be located at a second angle. The first angle is greater than the first medium angle, and the second angle is greater than the second medium angle. Thus, various turning angles of the doorbell 10 could be provided for the user to choose from.

In the current embodiment, merely one of the top extendable section 261a, the bottom extendable section 261b, the right extendable section 262a, and the left extendable section 262b is extended, and the other ones are folded. In practically, when the first extendable section 261 and the second extendable section 262 are exerted by a force to extend relative to the mounting portion 24, the extendable portion 26 could drive the connecting portion 22 and the doorbell 10 to turn along a third axis. The third axis is different than the first axis X and the second axis Y. For example, when the user would like to turn the doorbell 10 rightward and upward, the user could exert an external force away from the mounting surface S to the connection site between the bottom extendable section 261b and the left extendable section 262b to extend the bottom extendable section 261b and the left extendable section 262b. Thus, various turning directions could be provided for the user to choose from.

In view of the above, the extendable portion 26 drives the connecting portion 22 and the doorbell 10 to turn along the first axis X and/or the second axis Y, so that the user could adjust the turning angle of the doorbell 10 along two different axes on required demand. Thus, by adjusting the turning angle of the doorbell 10, the camera angle of the image capturing module 14 could be adjusted.

It must be pointed out that the embodiments described above are only some embodiments of the present invention. All equivalent structures which employ the concepts disclosed in this specification and the appended claims should fall within the scope of the present invention.

What is claimed is:

1. A mounting seat is provided to be mounted on a mounting surface and be connected to a doorbell, comprising:
   a mounting portion connected to the mounting surface;
   an extendable portion connected to the mounting portion, wherein the extendable portion and the mounting surface are located at opposite two sides of the mounting portion, respectively; when the extendable portion is exerted by a force, the extendable portion is operable to extend or to retract relative to the mounting portion; the extendable portion comprises a first extendable section and a second extendable section; and
   a connecting portion connected between the extendable portion and the doorbell;
   wherein when the first extendable section is exerted by a force to extend or retract relative to the mounting portion, the extendable portion drives the connecting portion and the doorbell to turn along a first axis; when the second extendable section is exerted by a force to extend or retract relative to the mounting portion, the extendable portion drives the connecting portion and the doorbell to turn along a second axis; the first axis and the second axis are not parallel to each other.

2. The mounting seat as claimed in claim 1, wherein the first axis is perpendicular to the second axis.

3. The mounting seat as claimed in claim 1, wherein each of the first extendable section and the second extendable section comprises a plurality of folded parts; each of the plurality of folded parts is connected to one another; when either the first extendable section or the second extendable section is retracted relative to the mounting portion, the plurality of folded parts of the retracted one of the first extendable section and the second extendable section is folded; when either the first extendable section or the second extendable section is extended relative to the mounting portion, the folded parts of the extended one of the first extendable section and the second extendable section are extended.

4. The mounting seat as claimed in claim 3, wherein when the plurality of folded parts of the first extendable section is partially extended, the first extendable section drives the connecting portion and the doorbell to turn to a first medium angle; when the plurality of folded parts of the second extendable section is partially extended, the second extendable section drives the connecting portion and the doorbell to turn to a second medium angle; when the plurality of folded parts of the first extendable section is completely extended, the first extendable section drives the connecting portion and the doorbell to be turned to a first angle; when the plurality of folded parts of the second extendable section is completely extended, the second extendable section drives the connecting portion and the doorbell to be located at a second angle; the first angle is greater than the first medium angle, and the second angle is greater than the second medium angle.

5. The mounting seat as claimed in claim 1, wherein the first extendable section comprises a top extendable section and a bottom extendable section that face opposite directions; the second extendable section comprises a right extendable section and a left extendable section that face opposite directions; the top extendable section, the left extendable section, the bottom extendable section, and the right extendable section are connected to one another to form the extendable portion.

6. The mounting seat as claimed in claim 5, wherein a connection site between the top extendable section and the right extendable section and a connection site between the top extendable section and the left extendable section are curved; a connection site between the bottom extendable section and the left extendable section and a connection site between bottom extendable section and the right extendable section are curved.

7. The mounting seat as claimed in claim 5, wherein a width of the extendable portion is gradually reduced in a direction from the connecting portion to the mounting portion.

8. The mounting seat as claimed in claim 1, wherein when the first extendable section and the second extendable section are exerted by a force to extend relative to the mounting portion, the extendable portion drives the connecting portion and the doorbell turns along a third axis; the third axis is different than the first axis and the second axis.

9. The mounting seat as claimed in claim 1, wherein the mounting portion, the extendable portion, and the connecting portion are integrally formed as a monolithic unit; the extendable portion is made of a flexible material.

10. A doorbell assembly, comprising:
the mounting seat as claimed in claim 1; and
a doorbell comprising a main body and an image capturing module, wherein the main body has a front side and a rear side that face opposite directions; the image capturing module is disposed at the front side of the main body, and the rear side of the main body is connected to the connecting portion of the mounting seat.

* * * * *